(No Model.)
S. J. BAKER.
HAY KNIFE.
No. 276,951.
Patented May 1, 1883.
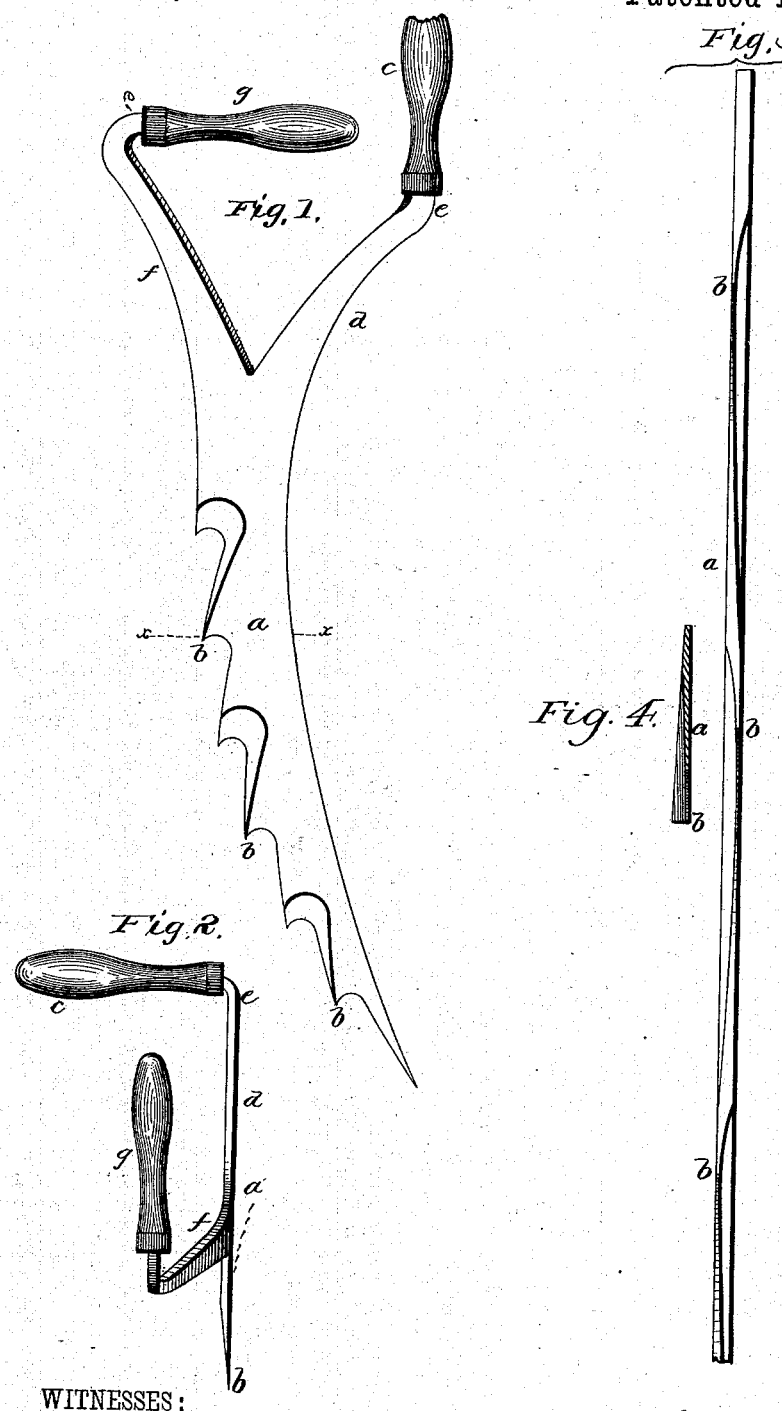
WITNESSES:
Fred. G. Dieterich.
Jno. W. Stockett.
INVENTOR.
Sanford J. Baker
ATTORNEYS.

UNITED STATES PATENT OFFICE.

SANFORD J. BAKER, OF WEST WATERVILLE, MAINE, ASSIGNOR OF ONE-THIRD TO JAMES H. MANDEVILLE, OF WASHINGTON, D. C.

HAY-KNIFE.

SPECIFICATION forming part of Letters Patent No. 276,951, dated May 1, 1883.

Application filed June 28, 1882. (No model.)

*To all whom it may concern:*

Be it known that I, SANFORD J. BAKER, a citizen of the United States, resident in West Waterville, in the county of Kennebec, in the State of Maine, have invented a new and useful Improvement upon Knives for Cutting Hay, Straw, Turf, Peat, or like Commodities, of which the following specification and its drawings is a full, clear, and exact description.

This improvement relates to the construction of the handle and to the teeth and blade of the knife.

The invention consists in making the front of the blade where the teeth are cut thicker than the back of the blade, and in forming the teeth hook-shaped and alternately beveled in such a manner as to have a cutting-edge upon both sides of the blade.

In the drawings, Figure 1 is a side elevation of my invention; Fig. 2, a top end elevation; Fig. 3, a front edge view of the knife alone; Fig. 4, a transverse section of same in line *x x*, Fig. 1.

In manufacturing my knife the arms for the two handles may be made by placing the shank of the blade while red-hot under a drop-die to split it, and the two handles may then be bent to the required shape by a former. Heretofore the shank of one handle has been welded to the other—a process which requires more time or more workmen than if both handles were made by machinery.

I am aware that a knife has been patented having teeth described as "inclining toward the point of the knife;" but its manufacture has been found impracticable, for the reasons hereinafter given. The teeth of my knife are manufactured hook-shaped, instead of at an angle. From this construction these advantages are gained:

First. The teeth will not slip or ride over. Sharpening the teeth does not destroy the curve of the hook. The curve remains the same, because the blade, when sharpened, is laid perfectly flat upon the grindstone. Sharpening the teeth when set upon an angle tends to set the angle farther back, and this causes the teeth all the more to slip over without cutting.

Second. A cutting-edge can be made below the hook and nearly for the entire length of the tooth.

It is not novel to make a saw with its cutting-edge thicker than the back of the saw-blade. That is both old and common; but such construction as applied to a hay-knife has not heretofore been known or used.

In the manufactures of knives having a tooth-edge it has not been deemed practicable to make the cutting-edge the thickest part of the blade, because the teeth have always been sharpened from each side toward the center of the blade upon a grindstone. This requires the blade to be held at different angles upon the stone. It requires too much care and too much time from the farmer, who is usually unskilled in the sharpening of edge-tools. The novelty in my construction of knife consists in transferring the cutting-edge from the center to both sides of the blade. This enables a farmer to lay his knife perfectly flat upon the grindstone, where it is ground without that particular exercise of care required where the teeth set upon an angle, and in a much shorter space of time than it possibly could be sharpened if the cutting-edge were made (as it commonly has been) in the center of the blade. To keep the outside of the blade a cutting-edge, the teeth are beveled alternately, first upon one side and then upon the other side. This makes a knife-edge upon both sides of the blade.

In the drawings the several parts are represented as follows: *a*, blade; *b*, hook-shaped teeth; *c*, handle for the left hand of the operator; *d*, shank or arm of the handle *c*; *e*, tangs for both handles; *f*, shank or arm of the handle *g* for use of the operator's right hand.

The hook-shaped teeth are cut out by a drop-punch or other suitable machinery, and then beveled alternately by means of an emery-wheel for about their entire length upon the inside only, as shown, in order to obtain a cutting-edge upon both sides and for about the entire length of the blade.

It will readily be seen that this is a much better construction of knife than where the cutting-edge is limited to one of the angles of the teeth. This knife cannot bind or wedge itself in the act of cutting. It always works freely, for it cuts out a kerf or chip the thickness of the knife—a result which cannot be accomplished with any other knife now known.

I claim—

A hay-knife blade made thickest at its cutting-edge and provided with hook-shaped teeth, the teeth being alternately beveled from one side to the other, in order to make each side of the blade a cutting-edge, constructed substantially as described.

SANFORD J. BAKER.

Witnesses:
 FRANK. S. BAKER,
 ABBIE M. BAKER,
 HORACE W. GREELEY.